(12) United States Patent
Shinbo et al.

(10) Patent No.: US 8,405,905 B2
(45) Date of Patent: Mar. 26, 2013

(54) SCREEN

(75) Inventors: Akira Shinbo, Shiojiri (JP); Ryoji Katsuma, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/412,050

(22) Filed: Mar. 5, 2012

(65) Prior Publication Data

US 2012/0229895 A1 Sep. 13, 2012

(30) Foreign Application Priority Data

Mar. 7, 2011 (JP) ................................ 2011-049126

(51) Int. Cl.
*G03B 21/56* (2006.01)
(52) U.S. Cl. ......... 359/448; 359/443; 359/449; 359/459
(58) Field of Classification Search ........... 359/443–461
See application file for complete search history.

(56) References Cited

U.S. PATENT DOCUMENTS

| 2008/0088921 A1 | 4/2008 | Yonekubo et al. | |
|---|---|---|---|
| 2009/0021828 A1* | 1/2009 | Shinbo et al. | 359/443 |
| 2009/0231696 A1 | 9/2009 | Shinbo et al. | |
| 2010/0092734 A1 | 4/2010 | Shinbo et al. | |
| 2010/0157424 A1 | 6/2010 | Katsuma et al. | |

FOREIGN PATENT DOCUMENTS

| JP | 2006-215162 | 8/2006 |
|---|---|---|
| JP | 2008-116911 | 5/2008 |
| JP | 2009-222981 | 10/2009 |
| JP | 4479832 | 3/2010 |
| JP | 2010-96883 | 4/2010 |
| JP | 2010-151902 | 7/2010 |

* cited by examiner

*Primary Examiner* — Clayton E Laballe
*Assistant Examiner* — Kevin Butler
(74) *Attorney, Agent, or Firm* — Workman Nydegger

(57) ABSTRACT

A screen on which an image according to light incident thereon is displayed includes a plurality of lens trains on a light-exiting surface from which the light exits, and the plurality of lens trains are provided along a plurality of virtual reference lines extending in respective predetermined directions. Each of the lens trains is formed of a plurality of lens elements from which the light exits. At least some of the plurality of lens elements that form any of the lens trains are so disposed that the lens elements are shifted from the reference line along which the lens train extends. The screen can suppress degradation of a displayed image.

9 Claims, 7 Drawing Sheets

SCREEN

BACKGROUND

1. Technical Field

The present invention relates to a screen on which an image is projected.

2. Related Art

There has been known a screen having a plurality of lens elements formed on a light-incident surface on which light is incident, each of which reflects the incident light (see JP-A-2006-215162, for example).

The screen described in JP-A-2006-215162 is so configured that a plurality of unit shape portions having the same shape are regularly disposed two-dimensionally on a surface of a substrate sheet and each of the unit shape portions is formed of a semispherical or convex-lens-shaped protruding portion. A reflection surface is formed on the surface of each of the unit shape portions in a section where light is incident from a projector disposed in advance in an intended position. Projection light obliquely projected from a position in front of the screen is diffused and reflected off the reflection surface of each of the unit shape portions, whereby viewers in a wide viewing range can view a projected image.

However, since the unit shape portions on the screen described in JP-A-2006-215162 are regularly arranged two-dimensionally, light fluxes that exit from adjacent unit shape portions travel along substantially the same optical paths and reach a predetermined viewing position, likely causing a moire pattern (interference fringes) and scintillation in a projected image. Such a moire pattern and scintillation tend to degrade the displayed image.

SUMMARY

An advantage of some aspects of the invention is to provide a screen capable of suppressing degradation of a displayed image.

An aspect of the invention is directed to a screen on which an image according to light incident thereon is displayed. The screen includes a plurality of lens trains on a light-exiting surface from which the light exits, the plurality of lens trains provided along a plurality of virtual reference lines extending in respective predetermined directions, and a plurality of lens elements which are provided in each of the lens trains and from which the light exits. At least some of the plurality of lens elements that form any of the lens trains are so disposed that the lens elements are shifted from the reference line along which the lens train extends.

Each of the lens elements can, for example, be configured to have a concave or convex curved surface.

According to the aspect of the invention, at least some of the plurality of lens elements that form any of the lens trains along the respective reference lines are so disposed that the lens elements are shifted from the reference line along which the lens train extends. The configuration allows the length of the optical path along which the light that exits from the lens elements shifted from the reference line travels and reaches a predetermined viewing position to differ from the length of the optical path along which the light that exits from other lens elements that are in the vicinity of the lens elements shifted from the reference line but are not shifted from the reference line travels and reaches the predetermined viewing position. That is, since the distance between each of the lens elements that are not shifted from the reference line and the corresponding one of the lens elements that are shifted from the reference line differs from the distance between the lens elements that are not shifted from the reference line, light fluxes that exit from the lens elements will not interfere with each other. As a result, moire (interference fringes) or scintillation will not occur and degradation of an image projected and displayed on the screen can be suppressed.

It is preferable that a virtual line is set between the reference line along which any of the lens trains extends and another one of the reference lines adjacent to the reference line in such a way that the virtual line extends along the reference line and the other reference line, and that the lens elements that form the lens train are so disposed that the centers of the lens elements are positioned on either the reference line along which the lens train extends or the virtual line.

For example, among the plurality of lens elements that form a single lens train along a single reference line, part of the lens elements may be so disposed that the centers thereof are positioned on the reference line and the centers of the other lens elements are positioned on a virtual line, or all the lens elements that form a single lens train may be so disposed that the centers thereof are positioned on a virtual line.

According to the configuration, among the lens elements that form a single lens train, the centers of at least part of the lens elements are positioned on a virtual line set between the associated reference line and a reference line adjacent thereto. The configuration allows the lens elements in a certain single lens train to be reliably so formed that the lengths of the optical paths along which light fluxes from the lens elements travel and reach a predetermined viewing position differ from one another, whereby degradation of a displayed image can be reliably suppressed.

The screen having the lens elements described above is manufactured in some cases by producing a master die having concave lens shapes according the lens elements and transferring the master die or an intermediate lens die produced from the master die to a base material. To form the lens shapes on the master die in an etching process, a mask layer is first formed on the surface of a master plate that will be the master die, and holes through which an etching liquid is injected are formed through the mask layer along the reference lines described above, for example, in a laser irradiation process.

However, when the number of lens elements that form a single lens train is relatively large and the amounts of shift of the lens elements from the corresponding reference line are set in a random manner, a hole formation apparatus for forming the holes through the mask layer needs to undergo a complex position adjustment process.

In contrast, since the aspect of the invention only requires position adjustment of the hole formation apparatus along the virtual lines and the reference lines, the position adjustment of the hole formation apparatus can be simplified, whereby steps of manufacturing the screen according to the aspect of the invention can be simplified.

It is preferable that the lens elements are arranged in substantially the same manner in each of the lens trains.

According to the configuration, since the lens elements are arranged in substantially the same manner in each of the lens trains, the lens trains extend along the corresponding reference lines across the screen. In this configuration, since the lens trains are formed to substantially coincide with the reference lines set based on the viewing angle, the brightness, and other factors, the viewing angle, the brightness, and other factors of the screen can be achieved substantially as designed.

It is preferable that the lens elements in each of the lens trains are randomly arranged in a direction along the reference line along which the lens train extends.

According to the configuration, the plurality of lens elements that form a single lens train are arranged randomly in a direction that intersects the reference line along which the lens train extends as well as in the direction along the reference line. The configuration allows the distances between the centers of the lens elements to further vary across the screen. It is therefore possible to suppress moire and scintillation and hence degradation of a displayed image in a more reliably manner.

It is preferable that each of the plurality of reference lines has an arcuate shape around a reference point set on the light-exiting surface or in an extension plane of the light-exiting surface.

According to the configuration, when a light source (projector, for example) that emits light fluxes to be incident on the screen, is placed in the vicinity of the reference point, the light fluxes travel over optical paths having substantially the same lengths and impinge on the lens elements that form the lens trains along the arcuate reference lines set around the reference point at substantially the same angles of incidence. As a result, the light fluxes tend to exit from the lens elements toward a predetermined viewing position, whereby the brightness of the screen viewed from the viewing position can be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will be described below with reference to the drawings.

Figure 1:
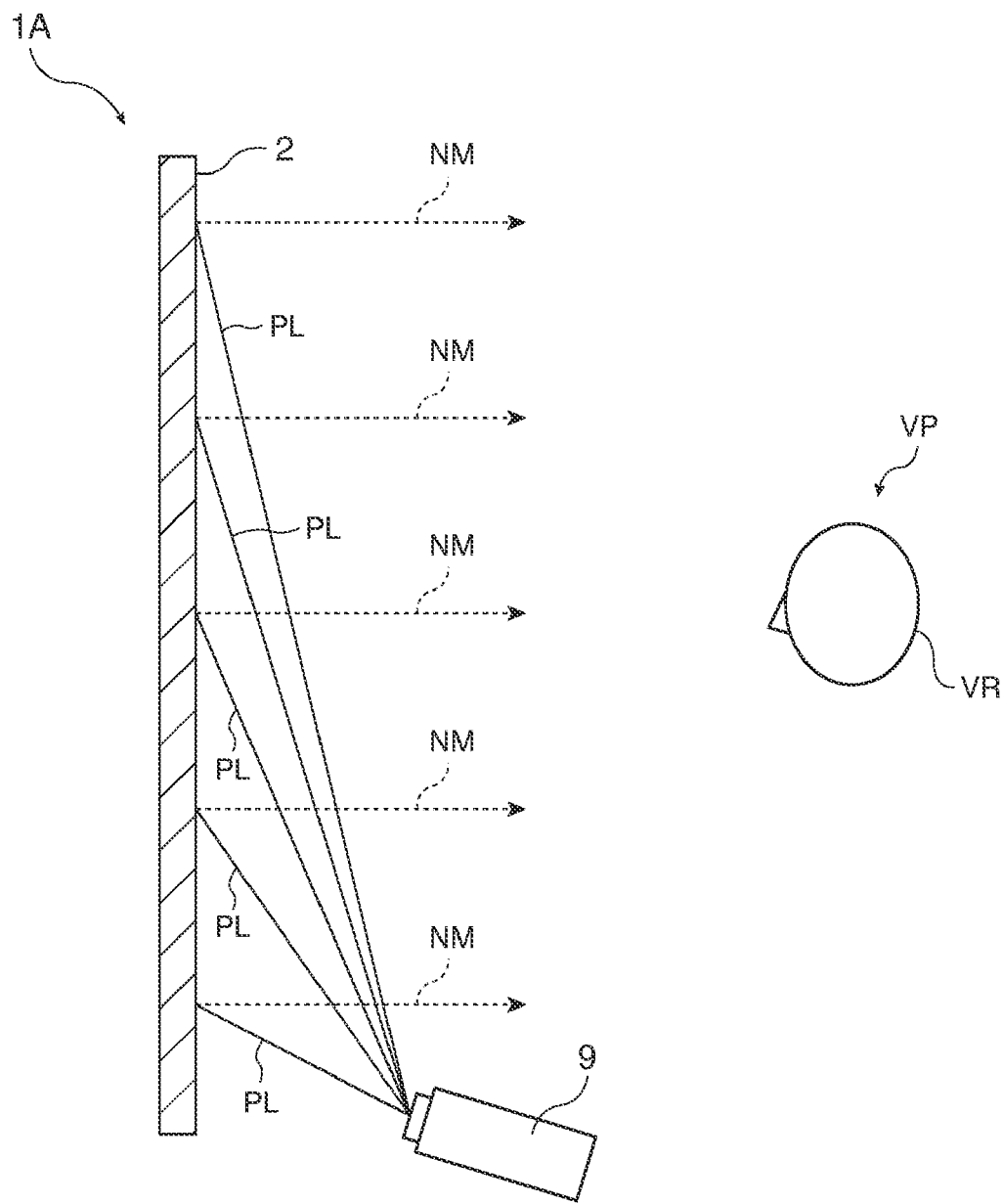
FIG. 1 is a side view showing a screen according to a first embodiment of the invention.

FIG. 1 is a side view showing a screen 1A according to the present embodiment.

The screen 1A according to the present embodiment reflects light projected from a projector 9 located in a lower position in front of the screen 1A back to a region in front of the screen 1A so that an image formed by the light is displayed on the screen 1A, as shown in FIG. 1. Specifically, the front surface of the screen 1A is a light-incident surface 2, on which projection light PL is incident, and reflects the incident projection light PL in the direction of a normal NM to the light-incident surface 2. A viewer VR in a viewing position VP apart from the screen 1A in the normal direction NM can thus view the image displayed on the screen 1A. The light-incident surface 2 can also be considered as a light-exiting surface that reflects the light incident thereon and outputs the light.

Figure 2:
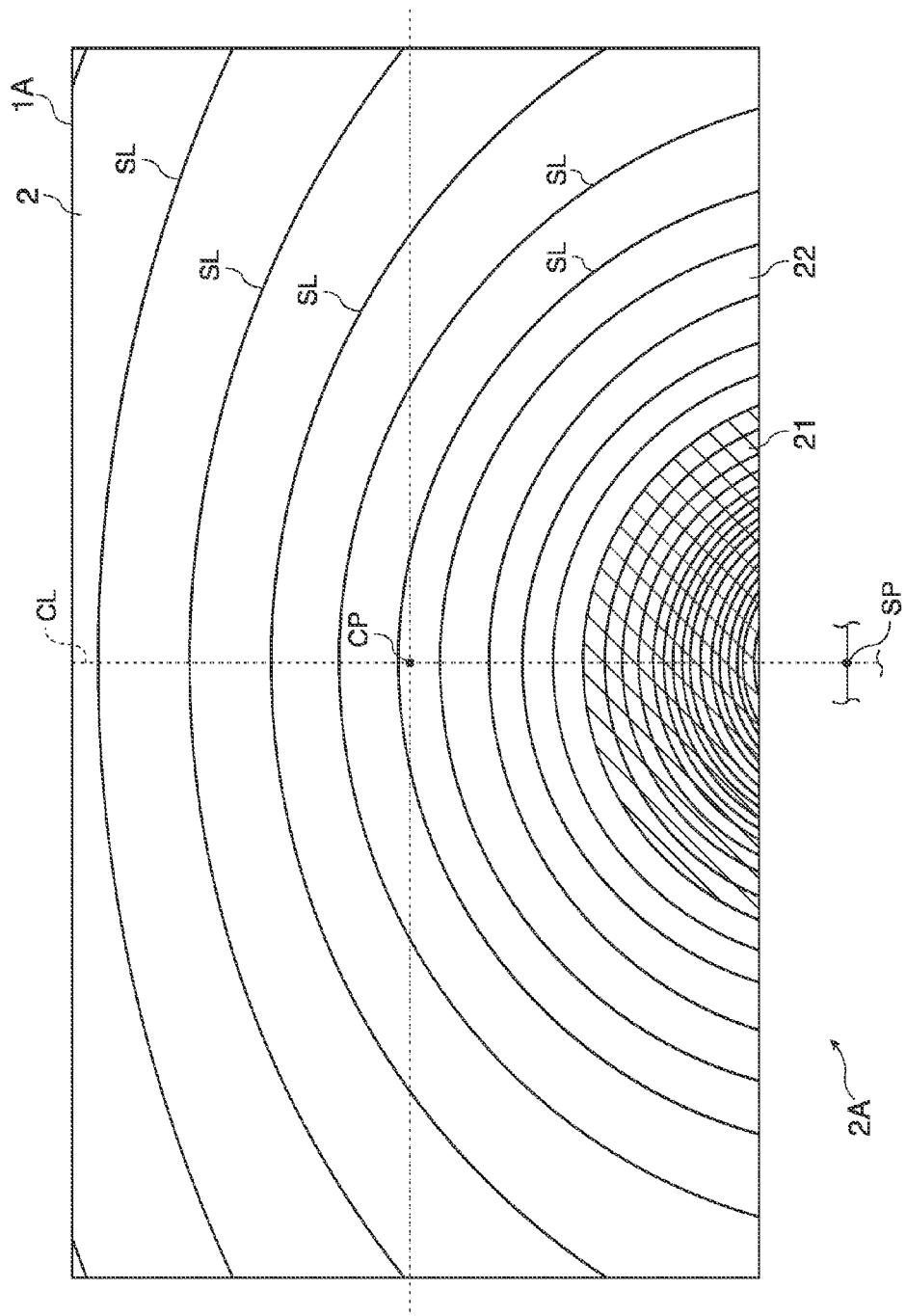
FIG. 2 is a front view showing the screen in the first embodiment.

FIG. 2 is a front view showing the screen 1A.

The light-incident surface 2 has a substantially rectangular shape when viewed from the front, as shown in FIG. 2. The light-incident surface 2 has a region 21 (hatched portion in FIG. 2) within a predetermined range around a reference point SP set in advance in an extension plane 2A of the light-incident surface 2 and a region 22 outside the region 21. Lens elements 3 (see FIGS. 3 and 4), which will be described later, are disposed in each of the regions 21 and 22.

Specifically, lens elements 3A, each of which is formed of a first concave portion 4 (see FIG. 3), are disposed in the regions 21 and 22 along arcuate virtual reference lines SL that form part of concentric circles (including circles and ellipses) around the reference point SP. Lens elements 3B, each of which is formed of a first concave portion 4 and a second concave portion 5 (see FIG. 4) formed adjacent to the first concave portion 4 on the side close to the reference point SP in the radial direction therefrom, are disposed in the region 22.

The distance between the reference lines SL set in the regions 21 and 22 is designed to increase with distance from the reference point SP, and the distance between the centers of the lens elements 3A, 3B therefore increases with distance from the reference point SP. The dimensions of the lens elements 3A and 3B in the radial direction from the reference point SP are also designed to increase with distance from the reference point SP.

FIG. 2 does not show all the reference lines SL but only shows representative ones. The reference lines SL are, in practice, set at narrower intervals. Further, in FIG. 2, part of the reference characters of the reference lines SL shown therein is also omitted. The reference point SP is set on a central line CL, which is a virtual straight line that passes through a central point CP of the light-incident surface 2, in the present embodiment.

Configuration of First Concave Portion

Figure 3:
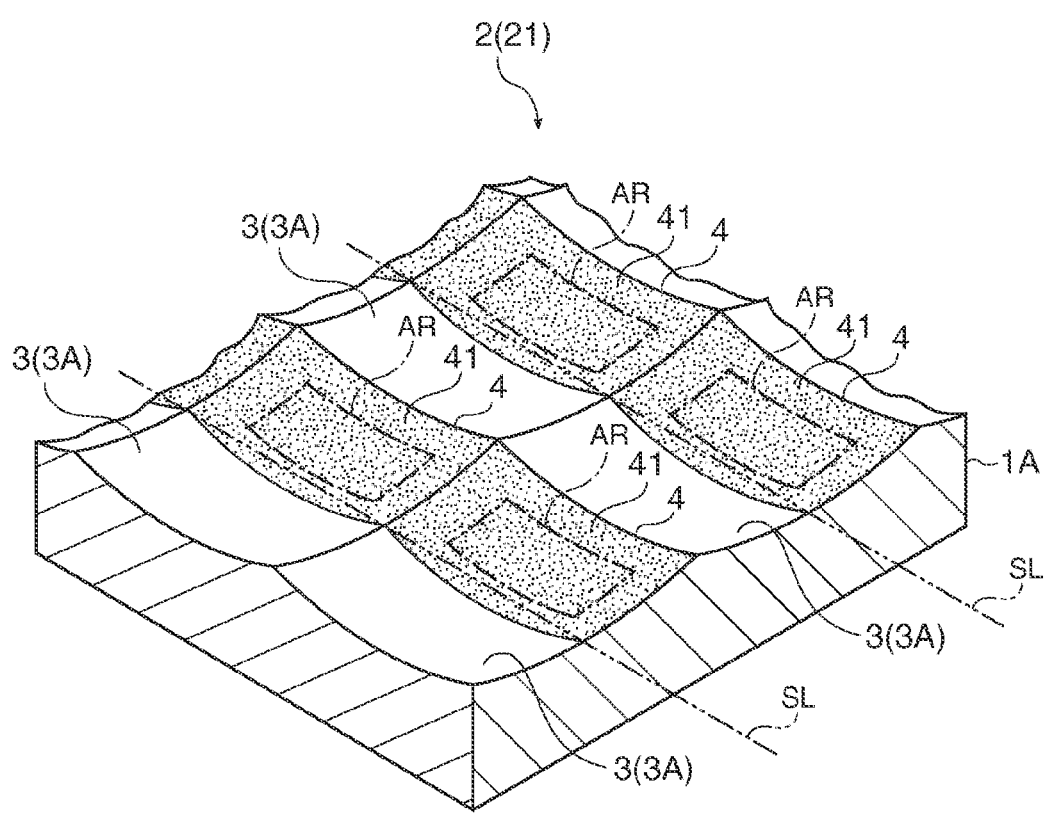
FIG. 3 is a perspective view showing lens elements in the first embodiment.

FIG. 3 is a perspective view showing the lens elements 3A.

The lens elements 3A, each of which is formed of the first concave portion 4, are formed along the reference lines SL described above in the region 21, whereby a plurality of lens trains each of which is formed of a plurality of lens elements 3A along the reference lines SL are formed in the region 21.

Each of the lens elements 3A has a concave curved surface of predetermined curvature on which projection light is incident, and a reflection layer 41 is formed on the concave curved surface, as shown in FIG. 3. The region in which the reflection layer 41 is formed includes an effective reflection region AR capable of reflecting the projection light incident from the projector 9 in the direction of a normal to the light-incident surface 2. The reflection layer 41 is formed, for example, by applying highly reflective white paint in a spraying process or depositing aluminum or silver in an oblique evaporation process.

Configuration of Second Concave Portion

Figure 4:
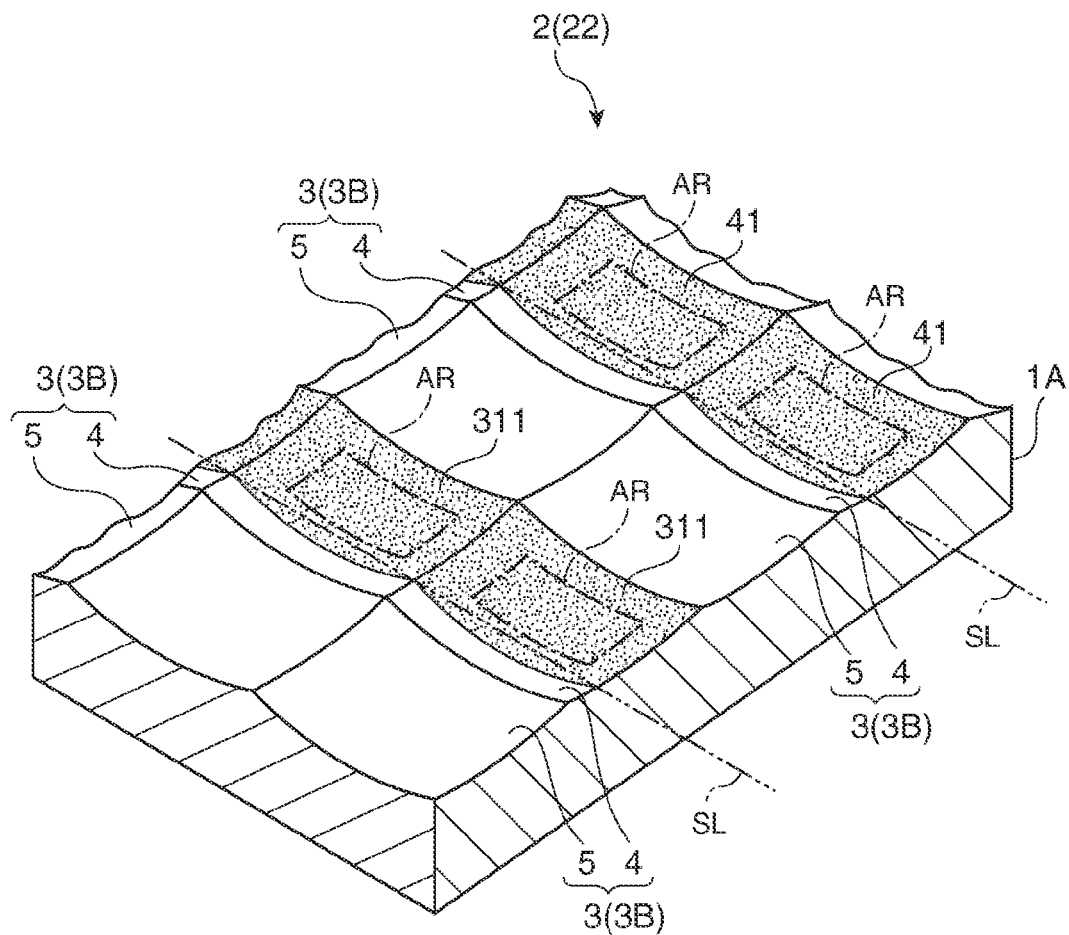
FIG. 4 is a perspective view showing other lens elements in the first embodiment.

FIG. 4 is a perspective view showing the lens elements 3B.

The lens elements 3B, each of which is formed of the first concave portion 4 and the second concave portion 5, are formed along the reference lines SL described above in the region 22, whereby a plurality of lens trains each of which is formed of a plurality of lens elements 3B along the reference lines SL are formed in the region 22.

The second concave portions 5 in the region 22 are formed adjacent to the first concave portions 4 on the side close to the reference point SP in the radial direction therefrom (in the direction A shown in FIG. 5A, for example), as shown in FIG. 4. The second concave portions 5 allow the projection light to be incident on the first concave portions 4 (effective reflection regions AR in detail) adjacent thereto.

When the projection light PL is obliquely incident on the light-incident surface 2 from the projector 9 located in a lower position in front of the light-incident surface 2, the angle between the path of the projection light PL (solid lines) and the direction of a normal NM to the light-incident surface 2 (dotted lines) increases as the distance from the origin of the projection light (position where projector 9 is placed) to the position on the light-incident surface 2 where the projection light is incident increases, as shown in FIG. 1. In the example shown in FIG. 1, the angle in an upper portion is greater than the angle in a lower portion.

If the second concave portions 5 are not formed, the projection light that is about to be incident on the effective reflection area AR of a certain first concave portion 4 is disadvantageously blocked by the edge of another first concave portion 4 positioned on the side of the certain first concave portion 4 close to the reference point SP in the radial direction. In this case, since the projection light is not incident on the effective reflection area AR of the certain first concave portion 4, the projection light is not reflected toward an entire necessary range in front of the screen, and it is therefore difficult to ensure the full viewing angle of the screen.

To address the problem described above with a first concave portion 4 far away from the reference point SP, a second concave portion 5 is formed in the lens element 3B including the first concave portion 4 on the side close to the reference point SP in the radial direction therefrom so that the projection light can be appropriately incident on the effective reflection area AR of the first concave portion 4, whereby the full viewing angle of the screen 1A can be ensured.

Arrangement of Lens Elements

Figure 5A:
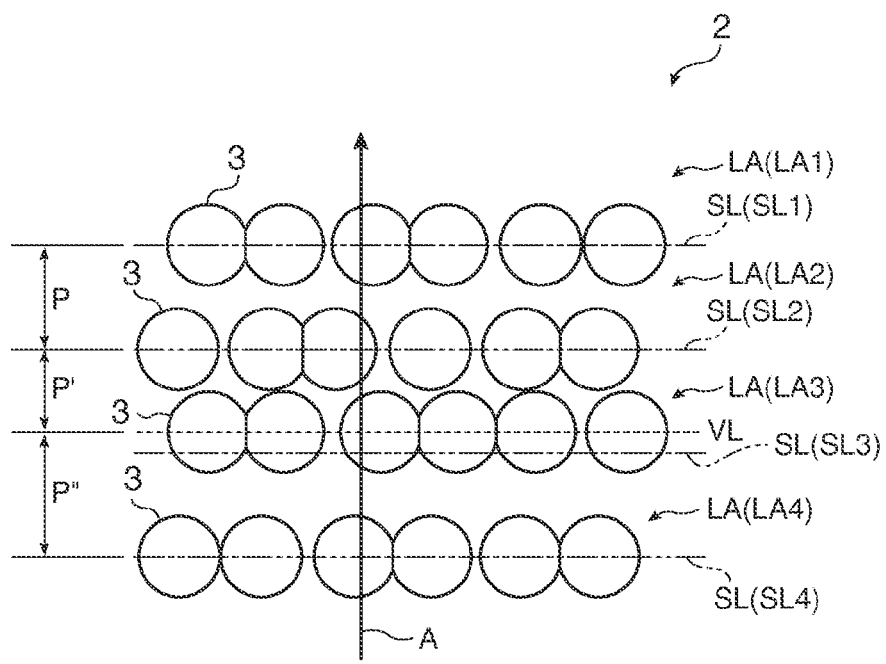
FIG. 5A is an enlarged view of a light-incident surface showing an arrangement pattern of the lens elements in the first embodiment.
Figure 5B:
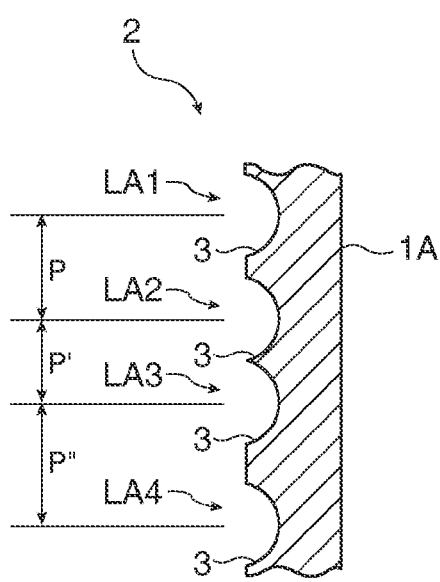
FIG. 5B is a cross-sectional view of the light-incident surface in the first embodiment.

FIG. 5A is an enlarged view of the light-incident surface 2 showing an arrangement pattern of the lens elements 3, and FIG. 5B is a cross-sectional view of the light-incident surface 2 taken along the radial direction from the reference point SP. In FIG. 5A, in which each of the lens elements 3 is expressed as a circular element, only part of the lens elements 3 are labeled with the reference character for ease of illustration.

In a lens train formed of a plurality of lens elements 3 arranged along a single reference line SL, all the centers of the lens elements 3 that form the lens train are not positioned on the reference line SL, but the centers of at least some of the lens elements 3 that form the lens train are shifted from the reference line SL. In the present embodiment, lens trains LA in each of which the centers of all the lens elements 3 are positioned on the corresponding reference line SL and lens trains LA in each of which the centers of all the lens elements 3 are positioned on a virtual line set between the associated reference line SL and another reference line SL adjacent thereto are formed on the light-incident surface 2, as shown in FIG. 5A.

Specifically, among the lens trains LA along the reference lines SL (SL1 to SL4) in the example shown in FIG. 5A, the lens trains LA1, LA2, and LA4 along reference lines SL1, SL2, and SL4 are so configured that the centers of all the lens elements 3 are positioned on the corresponding reference lines SL. That is, the centers of all the lens elements 3 that form the lens train LA1 along the reference line SL1 are positioned on the reference line SL1, and the centers of all the lens elements 3 that form the lens trains LA2 and LA4 along the reference lines SL2 and SL4 are also positioned on the reference lines SL2 and SL4, respectively.

On the other hand, in the lens train LA3 along the reference line SL3, all the lens elements 3 are so disposed that the centers thereof are positioned on a virtual line VL set between the reference line SL3 and the reference line SL2 adjacent thereto. The virtual line VL is so set that it extends along the reference lines SL2 and SL3, which sandwich the virtual line VL.

In the configuration described above, let "P" be the distance between the lens trains LA1 and LA2, "P'", which is smaller than "P", be the distance between the lens trains LA2 and LA3, and "P''", which is greater than "P", be the distance between the lens trains LA3 and LA4, as shown in FIGS. 5A and 5B. The arrangement described above allows the distance between the centers of lens elements 3 adjacent in the radial direction from the reference point SP (in the direction of the arrow A in FIG. 5A) to have a variety of values.

Further, the lens elements 3 that form the lens trains LA (LA1 to LA4) are randomly disposed in the direction along the reference lines SL (SL1 to SL4). The arrangement allows the distance between the centers of the lens elements 3 to have a variety of values.

In the present embodiment, in which the lens elements 3 in each of the lens trains LA are randomly arranged in the direction along the corresponding reference line SL, the lens elements 3 may be arranged in the same pattern in each of the lens trains LA. That is, in each of the lens trains LA, the lens elements 3 may be randomly arranged in the direction along the corresponding reference line SL, whereas the lens elements 3 may be arranged in the same arrangement pattern in each of the lens trains LA.

As described above, since the distance between the centers of adjacent lens elements 3 disposed on the light-incident surface 2 (the distance between the centers of adjacent lens elements in the radial direction described above and the distance between the centers of adjacent lens elements in the direction along any of the reference lines SL) can be designed to have a variety of values, the length of the optical path along which light reflected off each of the lens elements 3 travels and reaches the viewing position VP has a variety of values, whereby optical interference can be suppressed. No moire (interference fringes) or scintillation will therefore occur in a projected image that is reflected off the light-incident surface 2 and visually recognized.

In the present embodiment, the virtual line VL, on which the centers of the lens elements 3 that form the lens train LA3 along the reference line SL3 are positioned, is set between the reference line SL3 and the reference line SL2 adjacent thereto on the side away from the reference point SP in the radial direction described above. The virtual line VL is not necessarily set as described above but may alternatively be set between the reference line SL3 and the reference line SL4 adjacent thereto on the side close to the reference point SP in the radial direction.

The distance between the virtual line VL and the associated reference line SL is preferably 50% of the distance from the reference line SL to the reference line SL adjacent thereto or shorter. For example, in the example shown in FIGS. 5A and 5B, the distance between the reference line SL3 and the virtual line VL is preferably 50% of the distance "P", which is the distance between the reference line SL3 and the reference line SL2, or shorter. The reason for this is that if the distance between the reference line SL3 and the virtual line VL is greater than 50% of the distance "P", the lens elements 3 in the lens train LA3 interfere with the lens elements 3 in the lens train LA2 along the reference line SL2 and the area of each of the effective reflection regions AR along the reference lines SL2 and SL3 is reduced, probably resulting in a decrease in luminance of the screen 1A.

Further, the distance between the virtual line VL and the associated reference line SL is more preferably about 10% of the distance from the reference line SL to the reference line SL adjacent thereto. Setting the distance between the virtual line VL and the associated reference line SL as described above ensures the area of the effective reflection region AR in each of the lens elements 3 along the adjacent reference lines SL, reduces decrease in luminance of the screen 1A, and suppresses generation of streaky unevenness.

The screen 1A according to the present embodiment described above provides the following advantageous effects.

Among the lens trains LA along the corresponding reference lines SL, the lens elements 3 that form the lens train LA3 along the reference line SL3 are so disposed that they are shifted from the reference line SL3. This configuration allows the distances between the centers of the lens elements 3 in the lens train LA3 and the lens elements 3 adjacent thereto in the radial direction described above (corresponding lens elements 3 in lens trains LA2 and LA4) to differ from the distance between the centers of the lens elements 3 whose centers are positioned on the reference lines SL1 and SL2 (lens elements 3 in lens trains LA1 and LA2). The length of the optical path along which the light reflected off the lens elements 3 in the lens train LA3 travels and reaches the viewing position VP can therefore differ from the length of the optical path along which the light reflected off the lens elements 3 in the lens trains LA2 and LA4 adjacent to the lens elements 3 in the lens train LA3 travels and reaches the viewing position VP. As a result, interference between the light fluxes that exit from the lens elements 3 described above can be suppressed, whereby moire (interference fringes) or scintillation will not occur and degradation of a displayed image can be suppressed.

The lens elements 3 shifted from the reference line SL3 (lens elements 3 that form lens train LA3) are so arranged that the centers of the lens elements 3 are positioned on the virtual line VL set between the reference line SL3 and the reference line SL2 adjacent thereto. To produce a master die for molding the lens elements 3 described above, it is necessary to form holes through a mask layer in the positions where the lens elements 3 are formed. In this process, since the holes can be formed while the position of a hole formation apparatus is adjusted along the reference lines SL or the virtual line VL, the adjustment of the position of the hole formation apparatus can be simplified, whereby manufacturing steps of the screen 1A can be simplified.

A plurality of lens elements 3 that form a single lens train LA are so disposed that they are not only randomly shifted from the reference line SL along which the lens train LA extends in a direction that intersects the reference line SL (in radial direction described above) but also randomly shifted in the direction along the reference line SL. The configuration allows the distances between the centers of the lens elements 3 to further vary across the screen 1A. It is therefore possible to suppress moire and scintillation and hence degradation of a displayed image in a more reliably manner.

The arrangement pattern according to which the lens elements 3 are arranged with respect to the reference lines SL can be substantially the same in each of the lens trains LA. In this case, since the lens elements 3 in the lens trains LA are arranged with respect to the reference lines SL set based on the viewing angle, brightness, and other factors, the viewing angle, brightness, and other factors of the screens 1A can be achieved substantially as designed.

When the position of a light source that emits light fluxes to be incident on the screen 1A (that is, the position where the projector 9 is placed) is set in the vicinity of the reference point SP, the light fluxes travel over optical paths having substantially the same lengths and impinge on the lens elements 3 that form the lens trains LA along the reference lines SL at substantially the same angles of incident. In this case, the lens elements 3 tend to reflect the light fluxes toward the viewing position VP, whereby the brightness of the screen 1A viewed from the viewing position VP can be improved.

Second Embodiment

A screen according to a second embodiment of the invention will be described below.

The screen according to the present embodiment has the same configuration and function as those of the screen 1A described above. In the screen 1A, the centers of all the lens elements 3 that form the lens train LA3 along the reference line SL3 are located on the virtual line VL. In contrast, in the screen according to the present embodiment, each lens train along the corresponding reference line is formed of lens elements whose centers are positioned on the reference line and lens elements whose centers are positioned on a virtual line. The screen according to the present embodiment differs from the screen 1A in this respect. In the following description, portions that are the same or substantially the same as those having been described have the same reference characters and no description thereof will be made.

Figure 6A:
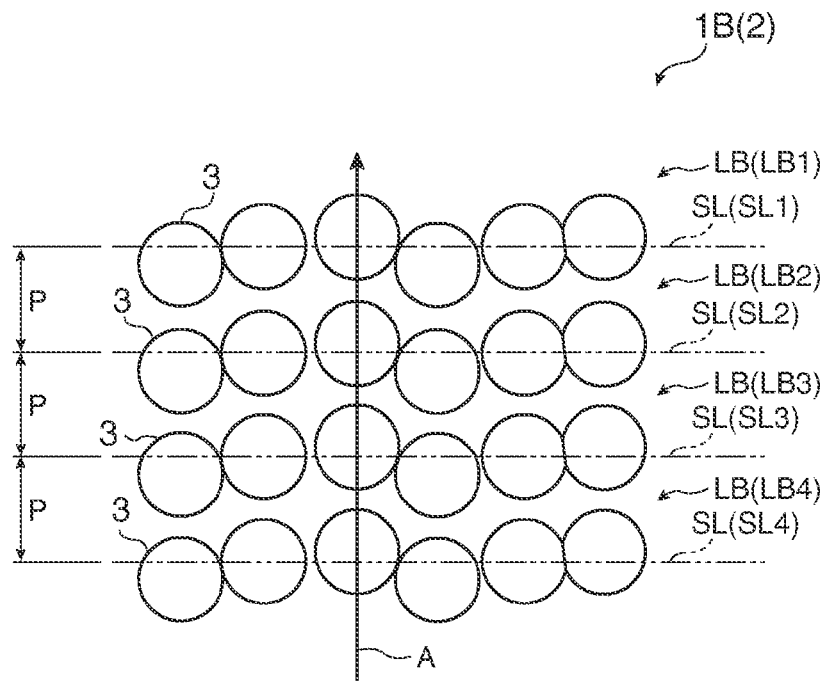
FIG. 6A is an enlarged view of a light-incident surface showing an arrangement pattern of lens elements in a second embodiment of the invention.
Figure 6B:
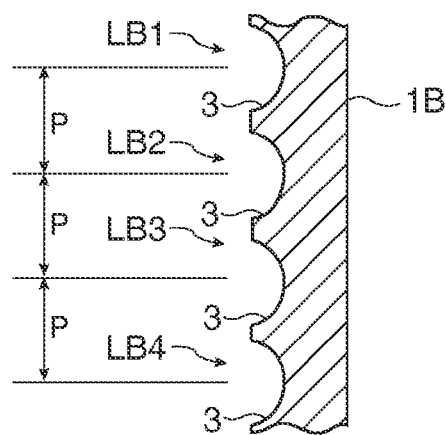
FIG. 6B is a cross-sectional view of the light-incident surface in the second embodiment.

FIG. 6A shows the arrangement pattern according to which the lens elements 3 are disposed on the light-incident surface 2 of a screen 1B according to the present embodiment, and FIG. 6B is a cross-sectional view of the light-incident surface 2 taken along the radial direction from the reference point SP. In FIG. 6A, in which each of the lens elements 3 is expressed as a circular element, only part of the lens elements 3 are labeled with the reference character for ease of illustration.

The screen 1B according to the present embodiment has the same configuration and function as those of the screen 1A described above except that the arrangement pattern of the lens elements 3 is different.

On the light-incident surface 2 of the screen 1B, a plurality of lens elements 3 arranged along the reference lines SL (SL1 to SL4) form a plurality of lens trains LB (LB1 to LB4), as shown in FIG. 6A. The lens elements 3 that form each of the lens trains LB are so disposed that they are shifted from the corresponding reference line SL.

Figure 7:
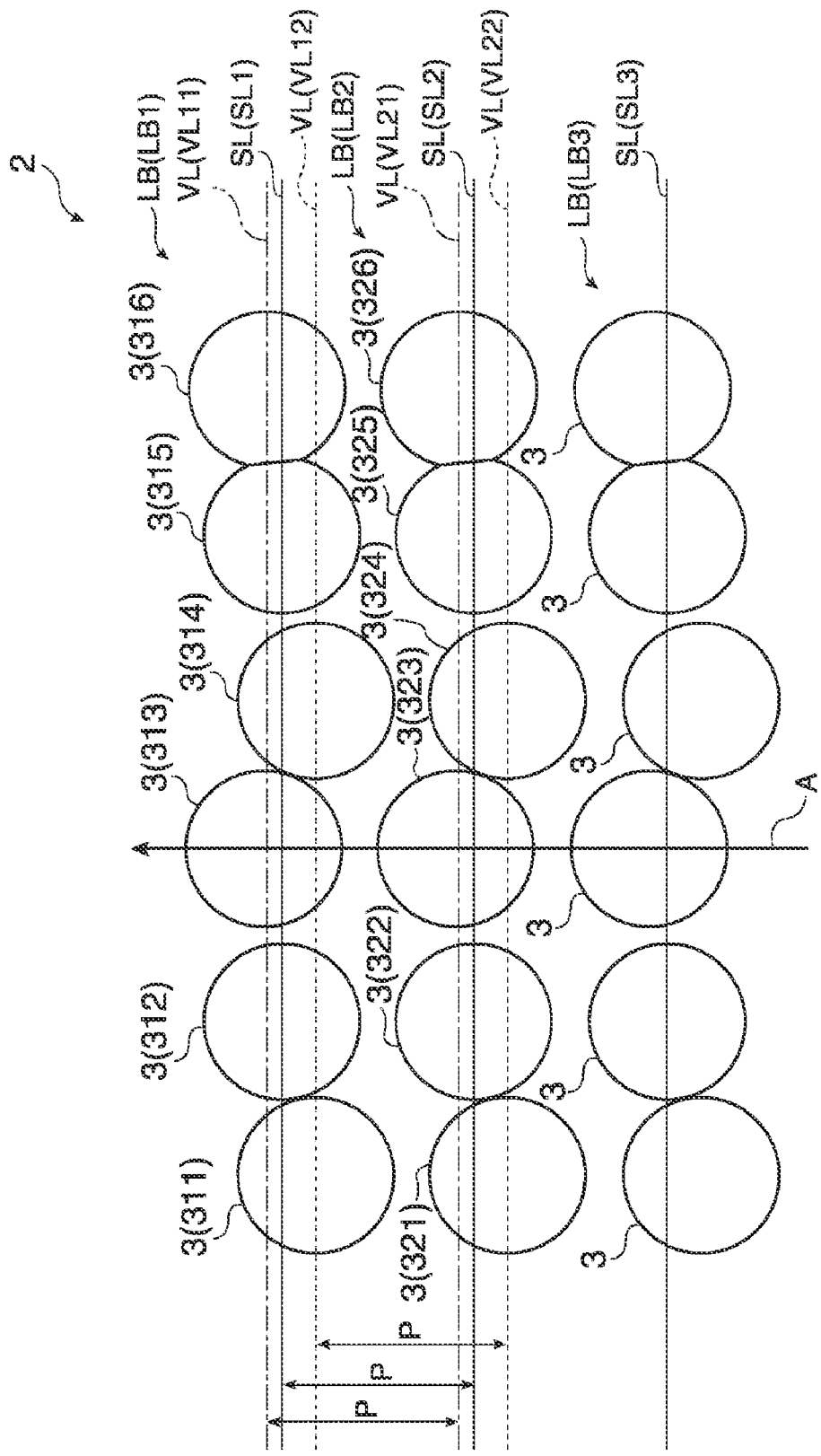
FIG. 7 is a diagrammatic view showing lens trains in the second embodiment.

FIG. 7 is a diagrammatic view showing the lens trains LB1 and LB2.

Specifically, the lens elements 3 that form each of the lens trains LB are so disposed that the centers of the lens elements 3 are positioned on either a virtual line VL set between the associated reference line SL and a reference line SL adjacent thereto or the reference line SL.

In the example shown in FIG. 7, for example, among the lens elements 3 (321 to 326) that form the lens train LB2 along the reference line SL2, the lens elements 322 and 325 are so disposed that the centers thereof are positioned on the reference line SL2. The lens elements 323 and 326 are so disposed that the centers thereof are positioned on a virtual line VL21 set between the reference line SL2 and the reference line SL1 adjacent thereto on the side away from the reference point SP in the radial direction described above. Further, the lens elements 321 and 324 are so disposed that the centers thereof are positioned on a virtual line VL22 set between the reference line SL2 and the reference line SL3 adjacent thereto on the side close to the reference point SP in the radial direction described above.

Similarly, among the lens elements 3 (311 to 316) that form the lens train LB1 along the reference line SL1, the lens elements 312 and 315 are so disposed that the centers thereof are positioned on the reference line SL1. The lens elements 313 and 316 are so disposed that the centers thereof are positioned on a virtual line VL11 set between the reference line SL1 and the reference line SL (not shown) adjacent thereto on the side away from the reference point SP in the radial direction described above. Further, the lens elements 311 and 314 are so disposed that the centers thereof are positioned on a virtual line VL12 set between the reference line SL1 and the reference line SL2 adjacent thereto on the side close to the reference point SP in the radial direction described above.

As described above, at least some of the lens elements 3 that form a single lens train LB are so disposed that the centers thereof are shifted from the corresponding reference line SL and positioned on virtual lines set between the reference line SL and reference lines SL adjacent thereto. As a result, the distances between the centers of adjacent lens elements 3 in the same lens train LB are not a single value but are a plurality of values or the distances between the centers vary, whereby moire (interference fringes) or scintillation will not occur in a projected image.

The amount of shift of a virtual line VL from the associated reference line SL is set at 50% of the distance from the reference line SL to a reference line SL adjacent thereto or smaller (more preferably about 10%), as in the screen 1A described above. It is further noted that the virtual lines VL are shifted from the associated reference lines SL by substantially the same the amount. The distances between the centers of the lens elements 3 that form a certain lens train LB and the lens elements 3 adjacent thereto in the radial direction described above are substantially the same along the lens train LB.

Specifically, the amount of shift of the virtual line VL21 from the reference line SL2 is equal to the amount of shift of the virtual line VL11 from the reference line SL1. Similarly, the amount of shift of the virtual line VL22 from the reference line SL2 is equal to the amount of shift of the virtual line VL12 from the reference line SL1.

Now, let "P" be the distance between the reference line SL2 and the reference line SL1. The distance between the center of the lens element 322 whose center is positioned on the reference line SL2 and the center of the lens element 312 whose center is positioned on the reference line SL1 and which is adjacent to the lens element 322 in the radial direction described above is therefore "P".

Further, the distance between the center of the lens element 323 whose center is positioned on the virtual line VL21 and the center of the lens element 313 whose center is positioned on the virtual line VL11 and which is adjacent to the lens element 323 in the radial direction described above is also "P".

Moreover, the distance between the center of the lens element 321 whose center is positioned on the virtual line VL22 and the center of the lens element 311 whose center is positioned on the virtual line VL12 and which is adjacent to the lens element 321 in the radial direction described above is also "P".

Similarly, the distance between the centers of the lens elements 324 and 314, the distance between the centers of the lens elements 325 and 315, and the distance between the centers of the lens elements 326 and 316 are also the same value "P".

The distances between the centers of the lens elements 3 that form a certain lens train LB and the centers of the lens elements 3 adjacent thereto in the radial direction described above are substantially the same along the same lens train LB, as shown in FIGS. 6A, 6B, and 7.

As a result, the lens elements 3 in a certain single lens train LB are randomly arranged in the direction along the corresponding reference line SL, whereas the arrangement pattern in the direction along the reference line SL is the same in each of the lens trains LB. Specifically, the arrangement patterns of the lens elements 3 in the lens trains LB1 to LB4 are substantially the same, as shown in FIG. 6A.

On the other hand, a reference line SL close to the reference point SP is approximately an arc that forms part of a perfect circle, whereas a reference line SL far away from the reference point SP is approximately an arc that forms part of an ellipse whose major axis extends in the longitudinal direction of the light-incident surface 2, as shown in FIG. 2. The length of the major axis described above increases as the distance from the corresponding reference line SL to the reference point SP increases. In other words, a reference line SL approaches a straight line extending in the longitudinal direction of the light-incident surface 2 as the distance from the reference line SL to the reference point SP increases.

In the lens trains LB, the distance between the center of a lens element 3 and the center of a lens element 3 adjacent thereto in the radial direction described above therefore slightly increases as the positions of the lens elements 3 deviate from the central line CL (see FIG. 2) and approach the periphery of the screen.

The screen 1B according to the present embodiment described above provides the following advantageous effects as well as those provided by the screen 1A described above.

The lens train LB2 along the reference line SL2 includes not only the lens elements 322 and 325 whose centers are positioned on the reference line SL2 but also the lens elements 323 and 326 whose centers are positioned on the virtual line VL21 set between the reference line SL2 and the reference line SL1 adjacent thereto on the side away from the reference point SP in the radial direction described above and the lens elements 321 and 324 whose centers are positioned on the virtual line VL22 set between the reference line SL2 and the reference line SL3 adjacent thereto on the side close to the reference point SP in the radial direction described above. This configuration allows the lens elements 3 that form each of the lens trains LB to be randomly shifted from the corresponding reference line SL than in the screen 1A described above, whereby the distances between the centers of the lens elements 3 can further vary. It is therefore possible to further suppress moire (interference fringes) and scintillation and hence degradation of a displayed image in a more reliably manner.

Variations of Embodiments

The invention is not limited to the embodiments described above. Changes, improvements, and other modifications can be made to the embodiments to the extent that they still ensure the advantage of the invention, and the modified embodiments fall within the scope of the invention.

In each of the embodiments described above, the lens elements 3 disposed in each of the lens trains LA and LB in the direction along the corresponding reference line SL are randomly arranged, but they are not necessarily arranged randomly in the invention. That is, the lens elements 3 in a single lens train may be so disposed that the distance between adjacent lens elements 3 is uniform, or the lens elements 3 in a single lens train may be periodically arranged with predetermined regularity.

In the second embodiment described above, the arrangement pattern of the lens elements 3 is substantially the same in each of the lens trains LB, but the arrangement patterns are not necessarily the same in the invention. That is, the arrangement patterns of the lens elements in the lens trains LB 3 may differ from each other, as in the case of the lens trains LA. Alternatively, the arrangement pattern of the lens elements 3 may be substantially the same in each of the lens trains LB, as described above.

In the second embodiment described above, the lens elements 3 that form each of the lens trains LB are so arranged that the centers of the lens elements 3 are positioned on a line chosen from the corresponding reference line SL and the virtual line VL set between the associated reference line SL and a reference line SL adjacent thereto, but the lens elements 3 are not necessarily arranged as described above in the invention. In other words, the positions of the lens elements 3 in a single lens train LB in the radial direction described above are randomly set in the second embodiment described above, but the positions are not necessarily set randomly in the invention. That is, the lens elements 3 may be periodically arranged with predetermined regularity. For example, the lens elements 3 that form the lens train LB2 described above may be so arranged that the centers of the lens elements 3 are sequentially positioned on the virtual line VL21, the reference line SL2, the virtual line VL22, the reference line SL2, the virtual line VL21, . . . or the lens elements 3 are arranged in zigzags with respect to the reference line SL2. Alternatively, the lens elements 3 may be so arranged that the centers thereof are sequentially positioned on the virtual line VL21, the reference line SL2, the virtual line VL22, the virtual line VL21, . . . . Still alternatively, the lens elements 3 may be so arranged that the centers thereof are sequentially positioned on the virtual line VL22, the reference line SL2, the virtual line VL21, the virtual line VL22, . . . . The same holds true for the other lens trains LB.

In the second embodiment described above, the single virtual line VL21 is set between the reference line SL2 and the reference line SL1 adjacent thereto on the side away from the reference point SP in the radial direction described above, and the single virtual line VL22 is set between the reference line SL2 and the reference line SL3 adjacent thereto on the side close to the reference point SP in the radial direction described above, but the virtual lines are not necessarily set as described above in the invention. That is, a virtual line VL set in association with a reference lines SL may be set only on the side away from the reference line SL in the radial direction or may be set only on the side close to the reference line SL in the radial direction. Further, the number of virtual lines VL set in association with a reference line SL can be set as appropriate.

In each of the embodiments described above, each of the reference lines SL has an arcuate shape that forms part of a circle (including perfect circle and ellipse) around the reference point SP, but the reference lines SL are not necessarily set as described above in the invention. That is, the reference lines may be set in parallel to each other on the light-incident surface. Alternatively, the shape of each of the reference lines SL may be a combination of an arc, a curved line, and a straight line as long as the reference lines SL are so set that the distance therebetween differ from each other with distance from the reference point.

In each of the embodiments described above, the reference point SP, which is the center of the reference lines SL, is set in the extension plane 2A of the light-incident surface 2, but the reference point SP is not necessarily set as described above in the invention. That is, the reference point SP may be set on the light-incident surface 2.

In each of the embodiments described above, each of the screens 1A and 1B is configured to include concave lens elements 3, but the screens 1A and 1B are not necessarily configured as described above in the invention. That is, the screens may be configured to include convex lens elements 3 instead of the concave lens elements 3.

In each of the embodiments described above, each of the screens 1A and 1B is configured to be a reflective screen that reflects the light projected by the projector 9 positioned in front of the screen back to a region in front of the screen, but the screens 1A and 1B are not necessarily configured as described above in the invention. That is, each of the screens 1A and 1B may be configured to be a transmissive screen that transmits the light incident thereon from the rear side thereof so that an image formed by the light is displayed on the screen. In this case, the rear surface of the screen functions as the light-incident surface, and the front surface of the screen functions as the light-exiting surface.

The invention is preferably applicable to a screen on which an image is displayed.

The entire disclosure of Japanese Patent Application No. 2011-49126, filed Mar. 7, 2011 is expressly incorporated by reference herein.

What is claimed is:

1. A screen on which an image according to light incident thereon is displayed, the screen comprising:
   a plurality of lens trains on a light-exiting surface from which the light exits, the plurality of lens trains provided along a plurality of virtual reference lines extending in respective predetermined directions; and
   a plurality of lens elements which are provided in each of the lens trains and from which the light exits,
   wherein at least some of the plurality of lens elements that form any of the lens trains are so disposed that the lens elements are shifted from the reference line along which the lens train extends,
   wherein a virtual line is set between the reference line along which any of the lens trains extends and another one of the reference lines adjacent to the reference line in such a way that the virtual line extends along the reference line and the other reference line, and
   the lens elements that form the lens train are so disposed that the centers of the lens elements are positioned on either the reference line along which the lens train extends or the virtual line.

2. The screen according to claim 1,
   wherein the lens elements are arranged in substantially the same manner in each of the lens trains.

3. The screen according to claim 1,
   wherein the lens elements in each of the lens trains are randomly arranged in a direction along the reference line along which the lens train extends.

4. The screen according to claim 1,
   wherein each of the plurality of reference lines has an arcuate shape around a reference point set on the light-exiting surface or in an extension plane of the light-exiting surface.

5. The screen according to claim 1,
   wherein each of the lens elements has a concave curved surface having a predetermined curvature.

6. The screen according to claim 1,
wherein each of the lens elements has a reflection layer formed thereon.

7. The screen according to claim 1,
wherein the distance between the virtual line and the associated reference line is 50% of the distance from the reference line to the reference line adjacent thereto or shorter.

8. A screen that reflects light incident thereon so that an image is displayed thereon, the screen comprising:
a plurality of lens trains on a light-exiting surface that reflects the incident light, the plurality of lens trains provided along a plurality of virtual reference lines extending in respective predetermined directions; and
a plurality of lens elements that are provided in each of the lens trains and reflect the light,
wherein at least some of the plurality of lens elements that form any of the lens trains are so disposed that the lens elements are shifted from the reference line along which the lens train extends,
wherein a virtual line is set between the reference line along which any of the lens trains extends and another one of the reference lines adjacent to the reference line in such a way that the virtual line extends along the reference line and the other reference line, and
the lens elements that form the lens train are so disposed that the centers of the lens elements are positioned on either the reference line along which the lens train extends or the virtual line.

9. A screen on which an image according to light incident thereon is displayed, the screen comprising:
a plurality of lens trains on a light-exiting surface from which the light exits, the plurality of lens trains provided along a plurality of virtual reference lines extending in respective predetermined directions; and
a plurality of lens elements which are provided in each of the lens trains and from which the light exits,
wherein at least some of the plurality of lens elements that form any of the lens trains are so disposed that the lens elements are shifted from the reference line along which the lens train extends,
wherein the lens elements in each of the lens trains are randomly arranged in a direction along the reference line along which the lens train extends.

* * * * *